United States Patent
Schubert et al.

[11] Patent Number: 5,494,754
[45] Date of Patent: Feb. 27, 1996

[54] FASTENER COATING AND PROCESS

[75] Inventors: Walter A. Schubert; Stephen K. Page; Eric G. Parker, all of Elgin; Albert W. van Boven, Schaumburg, all of Ill.

[73] Assignee: Illinois Tool Works Inc., Glenview, Ill.

[21] Appl. No.: 11,327

[22] Filed: Jan. 29, 1993

Related U.S. Application Data

[63] Continuation-in-part of Ser. No. 688,468, Apr. 22, 1991, abandoned.

[51] Int. Cl.$^6$ .............................. B32B 27/38; B05D 1/36; C25D 13/06
[52] U.S. Cl. ...................... 428/414; 428/416; 428/522; 428/702; 427/409; 427/411; 427/419.8; 205/118; 205/131; 204/488; 204/501
[58] Field of Search ...................................... 428/414, 416, 428/522, 702; 204/181.1, 181.4, 181.7; 427/409, 411, 419.8; 205/118, 131

[56] References Cited

U.S. PATENT DOCUMENTS

| 4,038,118 | 7/1977 | James | 428/36 X |
| 4,981,759 | 1/1991 | Nakatani et al. | 428/626 |
| 4,983,454 | 1/1991 | Hiraki et al. | 428/416 |

OTHER PUBLICATIONS

Sulfonate Based Coatings: Their Chemical, Physical, and Performance Properties, W. A. Higgins.
Sulphonates as Rust Inhibitors, O. N. Anand.
Protective Sulphonate Coatings, Mack W. Hunt; Apr. 1975.
Structurally–Modified Overbased Metal Salt Dispersions for Rust–Preventive Coatings, Mack W. Hunt; Apr. 1975.
Oil–Soluble Corrosion Inhibitors based on Sulfonated Alkylbenzenes, Yu. N. Shekhter; Jul. 1974.
Inhibited Oil Film Protection Mechanisms, O. V. Vasilenko; Feb. 1986.
Engine Lubricant Additives What They Are and How They Function, Dr. Thomas V. Liston; May 1992.
Sulfonate and Phosphate Chemistry to Improve Corrosion, Inhibition and Adhesion, W. A. Higgins; Feb. 1982.

*Primary Examiner*—P. C. Sluby
*Attorney, Agent, or Firm*—Trexler, Bushnell, Giangiorgi & Blackstone, Ltd.

[57] ABSTRACT

Corrosion resistant fasteners and similar articles are compositely coated in which an epoxy base coating is applied on an inner metallic core and a top coating is applied on the epoxy coating. The epoxy base coat is preferably applied on the metallic core by cathodic electrodeposition. The composition of the top coating can comprise sulfonates such as petroleum sulfonates and sulfurized hydrocarbon fatty acid and ester. Hydrocarbon fatty acid ester in the top coat can be derived from polymer of ethylene or propylene or natural oil. Particularly preferred top coat formulations additionally include a salt of sulfamic acid or a derivative and/or salts of barium such as barium carbonate and barium sulfate. The composite coatings provide improvement in corrosion resistance of the fasteners.

8 Claims, No Drawings

FASTENER COATING AND PROCESS

CROSS REFERENCE TO RELATED APPLICATION

This application is a continuation-in-part of application Ser. No. 688,468, filed Apr. 22, 1991, (now abandoned).

BACKGROUND OF THE INVENTION

This invention relates to corrosion resistant fasteners and more particularly relates to compositely coated fasteners.

Typical drill screws are widely used, for example, in automotive applications for attachment of a variety of fixtures to sheet metal and similar panels. Particularly in such automotive applications corrosion resistance is an important requirement of such screws. These screws have been successfully coated with decorative and protective pigmented coating such as polymer paint, and particularly corrosion resistant screws have been developed in which epoxy coatings are applied by electrodeposition on typical metal screws such as galvanized steel or aluminum core screws.

In accordance with this invention, these polymeric coated screws are provided with further improved corrosion resistance.

SUMMARY OF THE INVENTION

In accordance with the present invention, corrosion resistant fasteners and similar articles are compositely coated in which an epoxy base coating is applied on an inner metallic core and a top coating is applied on the epoxy coating. The epoxy base coat is preferably applied on the metallic core by cathodic electrodeposition. The composition of the top coating can comprise sulfonates such as petroleum sulfonates and sulfurized hydrocarbon fatty acid and ester.

Hydrocarbon fatty acid ester in the top coat can be derived from polymer of ethylene or propylene or natural oil. Particularly preferred top coat formulations additionally include a salt of sulfamic acid or a derivative and/or salts of barium such as barium carbonate and barium sulfate. The composite coatings provide improvement in corrosion resistance of the fasteners.

DETAILED DESCRIPTION

In accordance with the present invention, a variety of metallic articles, for example fasteners such as screws and nails, can be compositely coated to achieve particularly effective corrosion resistance. Broadly, metallic articles, such as a fastener typically fabricated from steel, zinc or aluminum is first coated by applying an epoxy primer or base coat to the metallic core. In a preferred base coating procedure, an epoxy paint formulation is applied to the metallic core by electrodeposition. Suitable epoxy paint formulations for such electrodeposition are commercially available, for example, from PPG Industries. Best corrosion protection has been obtained by cathodic electrodeposition of epoxy formulations on the metallic fastener core. The cathodic electrodeposition process is conducted by immersing the metallic part in the epoxy paint formulation and then placed in contact with the negatively charged electrode (cathode). When high voltage DC power is applied, positively charged epoxy paint ions migrate and attach to the negatively charged electrode and metallic part.

Particularly suitable epoxy paint formulations for cathodic electrodeposition are commercially available, such as those formulations supplied by PPG Industries in grades, for example, representatively designated epoxy CR-500 or CR 640 to which PPG additive CA 557 may be added for epoxy flow and porosity control. These epoxy paints are formulated with typical isocyanate crosslinking agents and the epoxy base is solubilized by attachment of amine groups and reacted with acetic acid. The cathodic electrodeposition results in positively charged epoxy paint ions reacting with hydroxyl ions at the negatively charged electrode and metallic parts to form insoluble amide while acetic acid is generated at the positive anode. Following the electrodeposition, the epoxy coated parts are rinsed to remove non-deposited and water-soluble paint residues. Thereafter, the coated parts are placed in a cure oven for sufficient time at an elevated temperature, for example in the range 350°–400° F., to crosslink and cure the epoxy coating on the parts. The thickness of the epoxy base coating can be, for example, in a range of approximately 0.0005–0.001 in. when applied on typical screw cores.

Following the cure, a top coating or finish coating is applied over the epoxy coating, which results in particularly effective resistance to corrosion of the parts even in severely corrosive conditions such as exposure to salt spray. Preferably, the finish coating is applied at a temperature in the range of approximately 100°–150° F. during cooling of the parts from the epoxy curing operation, after which the finish coated parts stand in ambient air for 3 to 5 minutes. Thereafter, any excess finish coating formulation is removed from the parts, for example by centrifuging.

The porous nature of the epoxy base coat on the metallic core appears to promote migration of the polar, sulfur end of the sulfonate molecule through pores or pinholes in the epoxy and the sulfur end is then chemisorbed to the metal core at the interface, whereby the epoxy and sulfonate cooperate to form a dense protective film on the metal core with the non-polar, water repellent, hydrocarbon end of the sulfonate molecule oriented outwardly through the epoxy pore from the polar, chemisorbed end.

Suitably, the sulfonate component of the applied top coating can be an alkaline or alkaline-earth sulfonate salt, for example sodium, calcium and barium salts of sulfonic acids. The hydrocarbon portion of the sulfonate can be either aromatic or aliphatic and can be emulsified in either hydrocarbon solvent or aqueous vehicle systems as more fully described in *Sulfonate Based Coatings: Their Chemical, Physical, and Performance Properties*, L. S. Cech, J. W. Forsberg, W. A. Higgins, The Lubrizol Corporation, Cleveland, Ohio. Suitable aromatic sulfonate components include petroleum sulfonate which may be complex mixtures of aromatic and polyaromatic sulfonates which can be formulated in napthenic distillate solvent or may be formulated with emulsifiers such as fatty acid ester to enable dispersion of the sulfonate as an aqueous formulation of the top coat such as the commercially available RUST PEL® SOLUBLE S product marketed by the Mitchell-Bradford Division of Hubbard-Hall Inc. Simple aromatic sulfonates such as calcium and barium alkylbenzene sulfonate may also be employed, for example the calcium alkylbenzene sulfonate products commercially available from Whitco Chemical Company in particular grade designated RP 214.

Aliphatic sulfonates such as calcium and barium salts of sulfurized fatty oil or fatty acid esters may be employed particularly compounded in organic solvent formulations, such as the commercially supplied RUST PEL® 51 further described hereinafter, in which the sulfonate is an overbased calcium and barium salt sulfonate of fatty acid ester and fatty oil such as vegetable and fish oils or synthetic hydrocarbon fatty acid ester from ethylene or propylene polymer. In either solvent or aqueous based formulations of the applied top coating, the sulfonate component at a concentration of approximately 4–6 weight percent has proven to significantly enhance the corrosion resistance when applied over epoxy coated fasteners. Both aromatic and aliphatic sulfonates preferably have hydrocarbons in a range of approximately 10–20 carbon atoms.

Particularly uniform coating and good adhesion to the epoxy undercoat has been achieved in dip and spin top coating of sulfonate formulations for example, as commercially supplied by Mitchell Bradford International Corp. under the trade name RUST PEL® such as the product designated Rust Pel® 51. These sulfonate formulations include additional fatty acid esters which promote very complete coverage of the epoxy undercoat and self-healing coverage action tending to cover any minute gaps in the top coating prior to complete drying and solvent removal.

Good results in adherence to the epoxy base coat and corrosion resistance have been obtained with a top coat resulting from application of Rust Pel® Soluble S, as well as Rust Pel® 51 formulated in Stoddard solvent mineral spirits. The slow evaporation rate of Stoddard solvent is characterized by a flash point of 100° F. with autoignition at 450° F. and a composition which boils (90%) below 375° F. The Rust Pel® 51 formulations also contain salts of sulfamic acid and small amounts of barium carbonate and barium sulfate which are additives believed to retard the drying rate of the solvent. The formulations can be blended or thinned with additional solvent to achieve modification of the specific gravity and viscosity for thorough coating as governed by the configuration of the part coated.

The excellent wettability of the Stoddard solvent formulation evidenced in the Rust Pel® 51 formulation applied over the epoxy coating is further characterized by contact angle of the wet formulation with the epoxy coating substrate, achieving a contact angle of zero indicating complete wettability and coverage of the undercoat. In contrast, a water based acrylic latex formulation commercially supplied by Cortec in a grade designated VCI 376 tends to bead up on equivalent cured epoxy coated parts exemplifying a high contact angle and poor wettability in coverage; furthermore, the dried acrylic latex readily flaked off the epoxy undercoat and was completely unsatisfactory as a finish or top coating.

EXAMPLES

The following Table reflects the particularly enhanced corrosion resistance provided by sulfonate top coats in accordance with the invention in comparison with the typical acrylic latex similarly applied in a conventional dip and spin application on identically cured and cathodic electrodeposition of epoxy coated screws having a steel ¼-20×1 in. hex head core configuration, under standard salt spray corrosion testing according to ASTM B117.

The commercially obtained Rust Pel® 51 formulation had a specific gravity in the range 0.0–0.82 as determined by the weight ratio of equal volumes of Rust Pel® 51 and distilled water. The commercial Rust Pel® 51 formulation was thinned with additional Stoddard solvent mineral spirits to a specific gravity in the range 0.78–0.80.

The epoxy coated screws were placed on a plastic panel 15 degrees from vertical, placed in the standard exposure cabinet and subjected to the salt spray for the indicated length of time before removal, rinsing, drying and evaluation. Comparative results are shown in the Table.

The commercially supplied Rust Pel® Soluble S formulation, without thinning, was similarly applied on the epoxy coated screws, and provided the indicated salt spray corrosion resistance.

The following Formulation I was prepared and then applied on the epoxy coated screws by dipping therein, followed by oven drying at 150° for 1 hour; comparative salt spray corrosion resistance is similarly indicated.

| | Formulation I | | |
|---|---|---|---|
| Component | Supplier | Product | Weight Percent |
| Mineral Spirit | Unocal | | 58.8 |
| Propylene glycol ethyl ether | Dow | Dowanol 22473 | 14.7 |
| Dipropylene glycol ethyl ether | Dow | Dowanol 22345 | 14.7 |
| Calcium alkylbenzene sulfonate | Witco | RP 214 | 5.9 |
| Motor Oil (hydrocarbon oil) | Sears | SAE 30 | 5.9 |

TABLE

| Top Coat Formulation | Time to Red Rust Corrosion |
|---|---|
| Thinned Rust Pel ® 51 | 300 hours |
| Rust Pel ® Soluble S | 240 hours |
| Formulation I | 300 hours |
| No top coat | less than 24 hours |
| Cortec VCI 376 acrylic latex | less than 24 hours |
| PPG W28 542 clear vinyl coat | less than 24 hours |

While particular embodiments of the present invention have been described herein, it will be obvious to those skilled in the art that changes and modifications in various aspects may be made without departing from the broad scope of the invention. Consequently, the scope of the invention is not limited by any particular embodiment but is defined by the appended claims and the equivalents thereof.

The invention is claimed as follows:

1. A fastener having improved corrosion resistance comprising:

a) an inner metallic core;

b) an epoxy coating applied on said core;

c) a top coating applied on said epoxy coating and comprising a sulfonate component including an alkaline or alkaline-earth sulfonate salt having an aromatic or aliphatic hydrocarbon portion thereof.

2. A fastener according to claim 1 wherein said sulfonate component comprises a sulfurized fatty oil or sulfurized fatty acid ester.

3. A fastener according to claim 2 wherein said sulfonate component has a concentration of approximately 4–6 weight percent of the total weight of a formulation applied to form said top coating.

4. A fastener according to claim 1 wherein said sulfonate component comprises petroleum sulfonate.

5. A fastener according to claim 1 wherein said sulfonate component comprises alkylbenzene sulfonate.

6. A fastener according to claim 5 wherein said sulfonate component has a concentration within a range of approximately 4–6 weight percent of the formulation applied to form said top coating.

7. A fastener according to claim 1 wherein said sulfonate component comprises sodium petroleum sulfonate.

8. A fastener according to claim 1 wherein said sulfonate component comprises calcium alkylbenzene sulfonate.

\* \* \* \* \*